United States Patent
Druzynski et al.

(10) Patent No.: US 6,435,393 B1
(45) Date of Patent: Aug. 20, 2002

(54) FILMSTRIP TRANSPORT MECHANISM WITH COMPENSATION FOR PERFORATION PITCH VARIATIONS FOR IMPROVED FILM REGISTRATION

(75) Inventors: Richard L. Druzynski, East Rochester; Jeffery R. Hawver, Rochester, both of NY (US)

(73) Assignee: Eastman Kodak Company, Rochester, NY (US)

( * ) Notice: Subject to any disclaimer, the term of this patent is extended or adjusted under 35 U.S.C. 154(b) by 27 days.

(21) Appl. No.: 09/756,620

(22) Filed: Jan. 8, 2001

Related U.S. Application Data

(60) Provisional application No. 60/209,767, filed on Jun. 6, 2000.

(51) Int. Cl.[7] .......................... G03B 1/28; B65H 20/12; B65H 23/00
(52) U.S. Cl. ............................... 226/57; 226/2; 226/58; 226/59; 226/95
(58) Field of Search ................ 226/2, 56, 57, 226/58, 59, 95

(56) References Cited

U.S. PATENT DOCUMENTS

| | | | | |
|---|---|---|---|---|
| 1,912,535 A | * | 6/1933 | MItchell | 226/57 |
| 1,930,723 A | * | 10/1933 | Mitchell | 226/57 |
| 2,129,093 A | * | 9/1938 | Kindelmann et al. | 226/58 |
| 2,619,006 A | * | 11/1952 | Debrie | 226/57 |
| 3,233,805 A | * | 2/1966 | Coutant et al. | 226/57 |
| 3,434,640 A | * | 3/1969 | Coutant et al. | 226/57 |
| 3,776,626 A | | 12/1973 | Lewis | 352/194 |
| 4,039,256 A | * | 8/1977 | Teeple, Jr. et al. | 226/95 X |
| 4,405,070 A | | 9/1983 | Blaschek | 226/55 |
| 4,522,476 A | * | 6/1985 | Renold | 352/225 |
| 5,328,073 A | * | 7/1994 | Blanding et al. | 226/57 X |
| 5,328,074 A | | 7/1994 | Blanding | 226/55 |
| 5,341,182 A | | 8/1994 | Schmidt | 352/184 |
| 5,423,467 A | | 6/1995 | Blanding | 226/3 |
| 5,529,232 A | | 6/1996 | Blanding | 226/58 |
| 5,543,869 A | | 8/1996 | Vetter | 352/184 |

FOREIGN PATENT DOCUMENTS

| | | | |
|---|---|---|---|
| GB | 1 575 536 | 9/1980 | G03B/1/22 |

* cited by examiner

Primary Examiner—Michael R. Mansen
Assistant Examiner—Minh-Chau Pham
(74) Attorney, Agent, or Firm—David M. Woods

(57) ABSTRACT

A perforated filmstrip transportation and registration system (100) and method provide a substrate in the form of a rotating drum (104) with vacuum holes (106) to allow an internally produced vacuum to act upon an engaged filmstrip (102). The rotating drum (104) has a number of registration-tension pin pair assemblies (216) that register and subsequently advance a filmstrip (102) at the 3 o'clock position in a registration mode (FIGS. 2 and 3), and are ready to be inserted in filmstrip perforations (208) when they approach the 3 o'clock position in a load mode (FIG. 4). The registration-tension pin pair assemblies (216) each contain a registration pin (220) and a tension pin (230) which are sized small enough to fit into filmstrip perforations (208) without interference, and which move away and towards each other in the nature of scissors blades in the preferred embodiment. In the registration mode, a side of the registration pin (220) rests against a side of one perforation, while the tension pin (230) engaged in an adjacent perforation, places the filmstrip (102) in tension by moving away from the registration pin (220). In the load mode, the tension pin (230) moves toward the registration pin (220) so that distance therebetween allows both pins to be easily inserted into prospective adjacent filmstrip perforations (208). In the preferred embodiment, the registration and tension pins (220, 230) are part of pin bodies (222, 232) which are spring loaded and activated via interaction with cam surfaces (260, 262).

20 Claims, 3 Drawing Sheets

FILMSTRIP TRANSPORT MECHANISM WITH COMPENSATION FOR PERFORATION PITCH VARIATIONS FOR IMPROVED FILM REGISTRATION

CROSS REFERENCE TO RELATED APPLICATIONS

This application claims the benefit of U.S. Provisional Application Number 60/209,767 filed Jun. 6, 2000 and entitled "Mechanical Motion Perforation Registration System for Continuous Motion Film Transports," said provisional application being assigned to the assignee of the present application, and said provisional application hereby being incorporated by reference.

FIELD OF THE INVENTION

The present invention relates to perforated filmstrip transport mechanisms in general, and to methods and apparatuses for consistently registering perforated filmstrip images in particular.

BACKGROUND OF THE INVENTION

High speed perforated filmstrip transportation for such applications as scanning, recording and optical printing not only require reliable movement of filmstrips, but also consistent registration of the filmstrip images. That is, it is important that each image on a filmstrip come to momentary rest at the same location along the direction of travel, within an acceptable tolerance. When images are not properly registered, undesirable image artifacts can be produced, with the severity of the artifacts being more pronounced with film transport speed.

One basic prior art approach to filmstrip registration is to use sprocket teeth (or pins) that engage the perforations with an interference fit. Because the action of insertion or removal of the pins can lead to image artifacts due to film displacement, such approaches require pauses in the processes which may greatly limit the filmstrip transport speed. Additionally, minute, periodic and random variations induced in the film manufacturing processing can also lead to image artifacts.

Another basic prior art filmstrip registration approach partially addresses the problems associated with the aforementioned approach, by using precisely machined pins which have a smaller projected area than the perforation areas. Registration is accomplished by using the filmstrip tension to rest edges of the perforations against the corresponding edge of the pins. For example, the pins can be made to consistently rest against the trailing edges of all of the perforations. While this approach allows for a faster filmstrip transport speed, it does not address the problem of inconsistent registration (and the resulting artifacts) due to variability in the distances between the perforation distances.

What is therefore of great interest—but not provided for in the prior art—are a high speed filmstrip transport device and method which eliminates image artifacts caused by variations in relative perforation distances.

SUMMARY OF THE INVENTION

To address the unmet needs of the prior art identified supra, the present invention provides a filmstrip transport system adapted for perforated filmstrip transport and filmstrip image registration. The system at least includes a substrate adapted to apply a normal force to a filmstrip, and a plurality of registration-tension assemblies carried by the substrate, the registration-tension assemblies each at least including a registration pin member having a registration pin sized for a non-interference fit with filmstrip perforations and a tension pin member having a tension pin sized for a non-interference fit with filmstrip perforations.

The registration-tension assemblies have a registration mode to engage and register a filmstrip by resting an edge of one perforation of the filmstrip against the side of an inserted registration pin, and placing the filmstrip in tension by pulling the filmstrip via a tension pin inserted in another perforation in the filmstrip, in a direction substantially parallel to the direction of filmstrip transport and away from the registration pin. The registration-tension assemblies also have a load mode to load the registration and tension pins into prospective perforations by moving the tension pin in a direction substantially parallel to the direction of filmstrip transport and toward the registration pin until the registration and tension pins achieve a distance therebetween permitting a non-interference fit into two filmstrip perforations.

The present invention also provides a method of transporting and registering a filmstrip. The method at least includes the steps of, via a substrate, providing a normal force to a filmstrip, and providing a plurality of registration-tension assemblies carried by the substrate, the registration-tension assemblies each at least including a registration pin member having a registration pin sized for a non-interference fit with filmstrip perforations and a tension pin member having a tension pin sized for a non-interference fit with filmstrip perforations.

The method also includes the steps of providing a registration mode to engage and register a filmstrip by resting an edge of one perforation of the filmstrip against the side of an inserted registration pin, and placing the filmstrip in tension by pulling the filmstrip via a tension pin inserted in another perforation in the filmstrip, in a direction substantially parallel to the direction of filmstrip transport and away from the registration pin, and providing a load mode to load the registration and tension pins into prospective perforations by moving the tension pin in a direction substantially parallel to the direction of filmstrip transport and toward the registration pin until the registration and tension pins achieve a distance therebetween permitting a non-interference fit into two filmstrip perforations.

BRIEF DESCRIPTION OF THE DRAWINGS

Features and advantages of the present invention will become apparent to those skilled in the art from the description below, with reference to the following drawing figures, which.

DETAILED DESCRIPTION OF THE INVENTION

Figure 1:
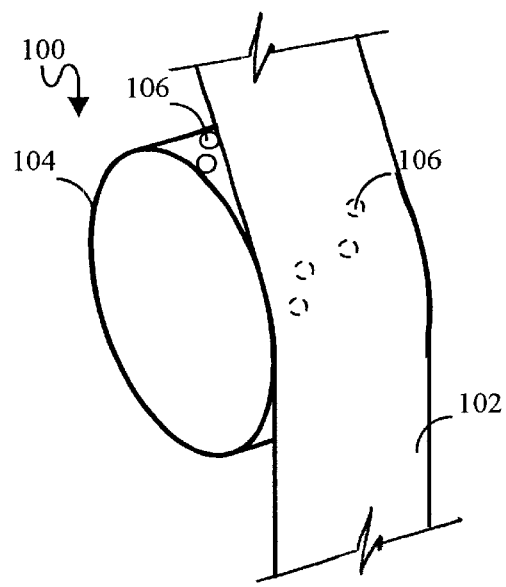
FIG. 1 is a general illustration of the filmstrip transport and image registration system of the present invention.

The present-inventive filmstrip transport and registration system 100, is generally shown in FIG. 1. The filmstrip transport and registration system 100 is capable of both advancing a filmstrip at a high speed, and properly registering each image frame by lining it with a registration pin, as detailed infra. The system 100 is principally embodied in and upon a rotary filmstrip transport drum mechanism 104, which also acts as a substrate. The drum mechanism 104 has a number vacuum holes 106 throughout its surface for allowing an internally produced vacuum to interact with a filmstrip touching the drum surface. In operation, the filmstrip touches the drum mechanism 104 so that there is a slight transverse displacement as shown in FIG. 1.

Figure 2:
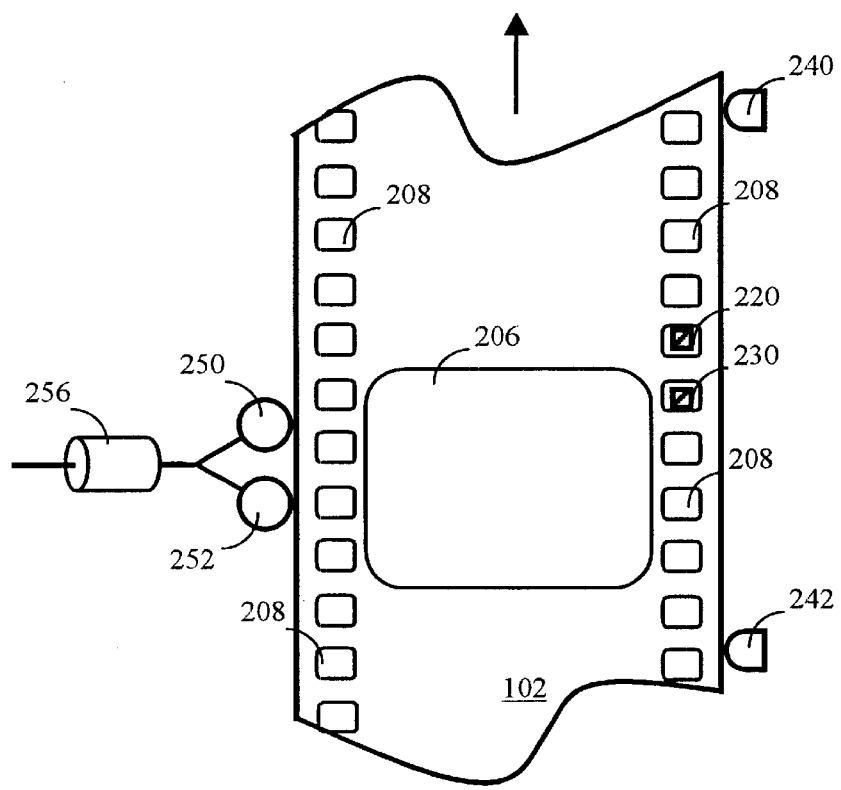
FIG. 2 is a view of a filmstrip engaged with a registration pin/tension pin pair of the rotary filmstrip transport drum mechanism of the present invention.

FIG. 2 illustrates a plan view of a perforated filmstrip 102 (the drum mechanism is obscured) in the "registration mode." That is, an image frame 206 is momentarily fixed (axially aligned) in its axial position along the direction of travel with respect to a registration pin 220 (inserted in a perforation 208) by pulling the filmstrip in a direction opposite the transport direction to place the filmstrip in tension, by a tension pin 230 (inserted into an adjacent perforation 208). The filmstrip is transversely aligned and restrained by resting one edge of the filmstrip against filmstrip guide edges 240 and 242 on one side, and by applying spring-loaded filmstrip guide rollers 250–252 on the other side. The spring-loaded rollers are connected to a spring-loaded roller support 256, which may be as simple as a spring member.

Figure 3:
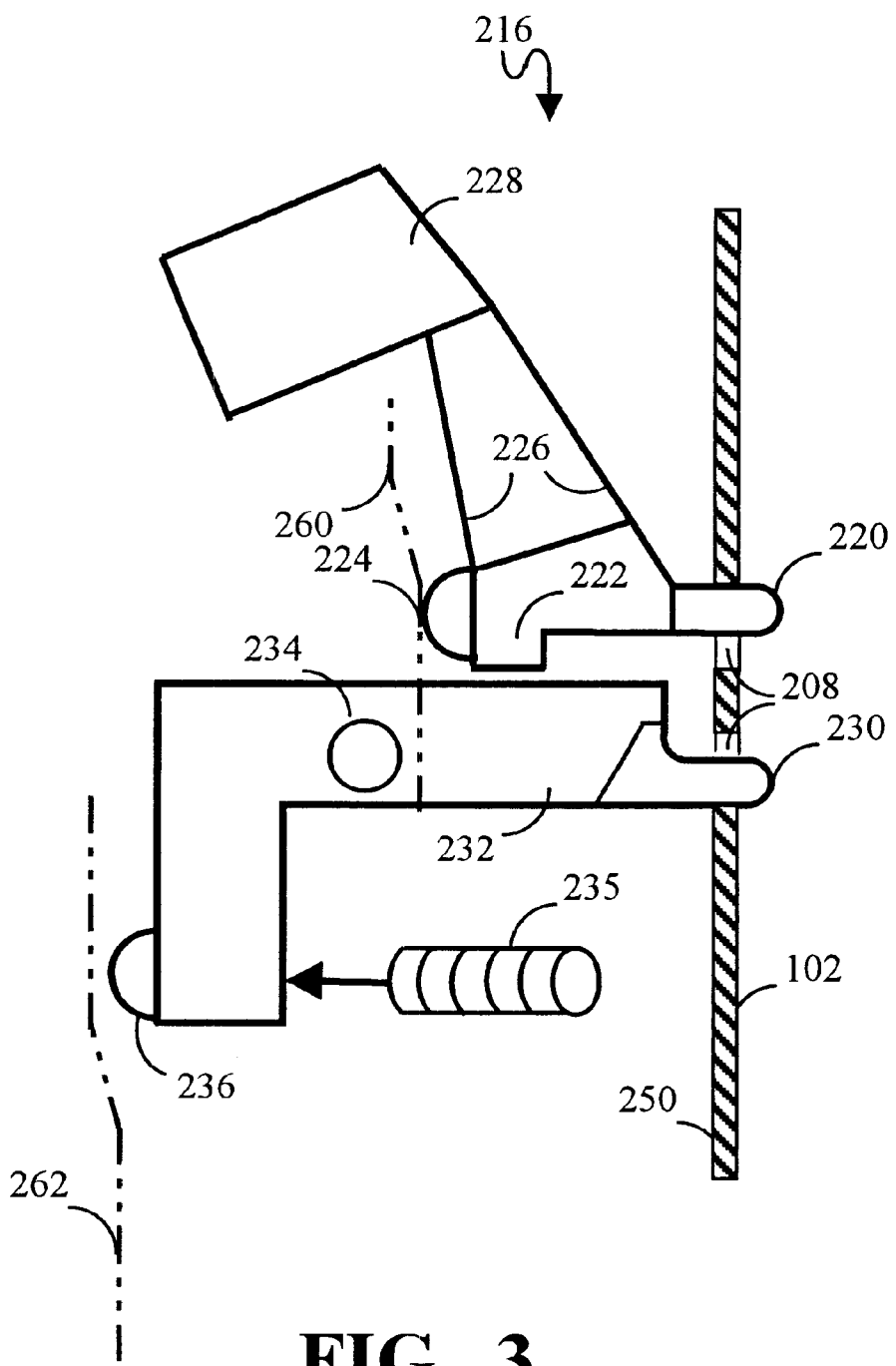
FIG. 3 is a side view of a registration pin/tension pin pair in the fully engaged ("in" or "registration") position, allowing for image/frame registration, and filmstrip advancement.
Figure 4:
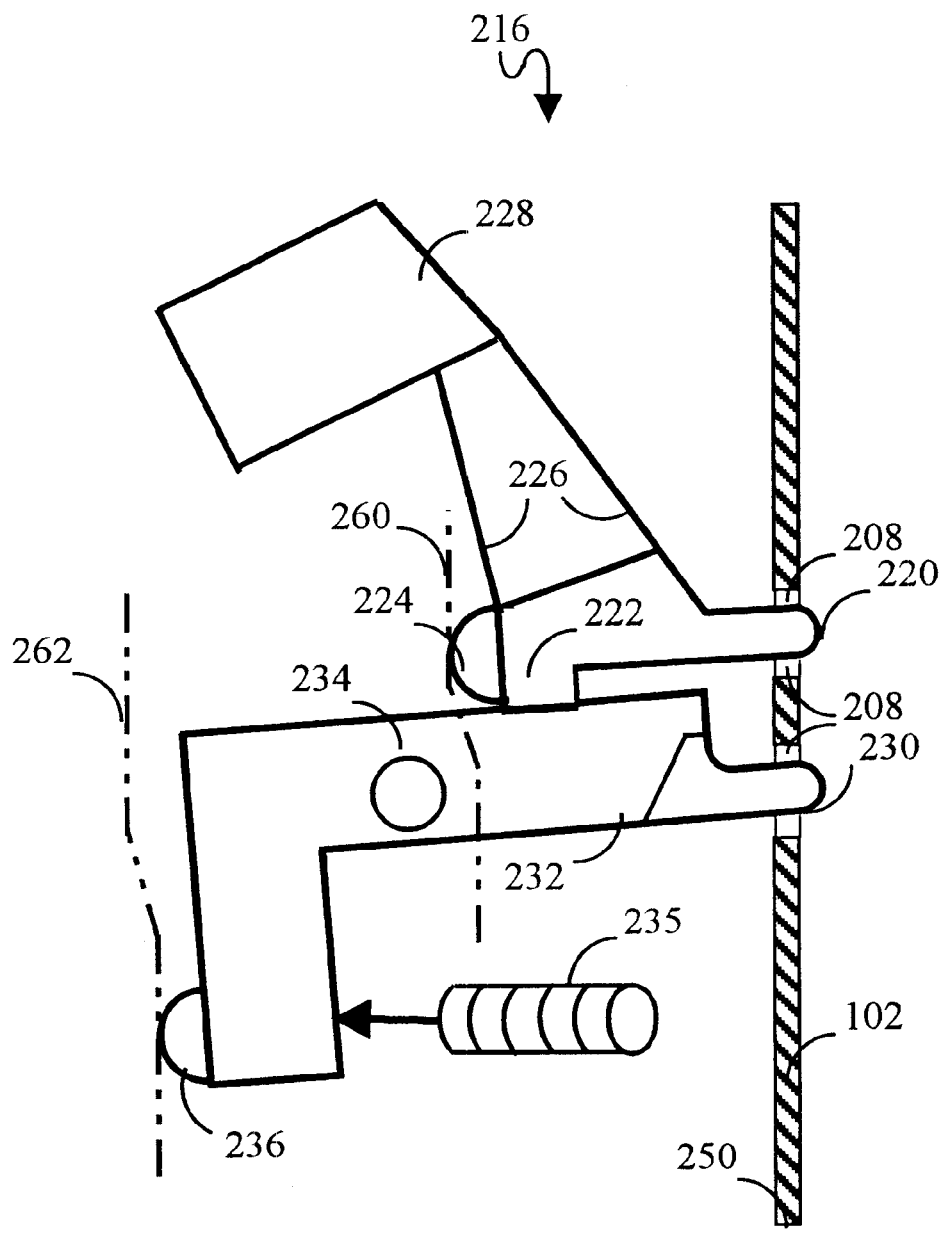
FIG. 4 is a side view of a registration pin/tension pin pair in the disengaged ("load") position, allowing for free insertion into filmstrip perforations.

FIGS. 3 and 4 show side views of the registration and tension pin pair assemblies 216 located on the periphery of the drum mechanism 104 in line with the filmstrip perforations 208. In particular, FIG. 3 shows a side view of an assembly 216 in the registration position, while FIG. 4 shows a side view of an assembly 216 in the load position.

The registration pin 220 is part of a registration pin body 222. The registration pin body 222 is connected to a fixed body 228 on the substrate/drum 104 by two flexible members ("flexures") 226, which allow curvilinear displacement of the registration pin when a cam surface 260 acts upon a registration pin body roller 224.

The tension pin 230 is part of a spring-loaded tension pin body 232. The tension pin body 232 pivots around a pivot point 234, attached to the substrate/drum 104. The tension pin body, and hence the tension pin moves curvilinearly, in response to the force of a cam surface 262 acting through a tension pin body roller 236.

The general operation of the perforated filmstrip transport and registration system is as follows. To place a registration and tension pin pair assembly 216 in the load mode, the cam surface 260 lowers the registration pin body 222, causing the registration pin 220 to move downward and toward the tension pin 230 in a curved path. Meanwhile, the cam surface 262 forces the tension pin body 232 to pivot toward the registration pin 220, so that the distance between the centerlines of the registration and tension pins is approximately equal to the average distance between the centerlines of two adjacent perforations. The rotating drum places the registration and tension pin assembly in the 3 o'clock position, whereupon the pins are inserted into two adjacent perforations.

To register a filmstrip image and move the filmstrip one frame length, the cam surface 260 raises the registration pin body 222 to place the side of the registration pin 220 against the front edge of a perforation, while a tension pin body spring 235 forces the tension pin body 232 to pivot and move the tension pin 230 away from the registration pin to place the filmstrip in tension by impinging the tension pin on the rear edge of a trailing perforation.

At any given moment, only one registration and tension pin assembly is in the registration mode, while the rest of the registration and tension pair assemblies are in the load mode.

Variations and modifications of the present invention are possible, given the above description. However, all variations and modifications which are obvious to those skilled in the art to which the present invention pertains are considered to be within the scope of the protection granted by this Letters Patent.

For example, the present invention is not limited to any particular perforated filmstrip type, and is generally adaptable to any perforated filmstrip transport operation. Also, it will be appreciated by those skilled in the art that, given the above description of the essence of the present invention, many components may have substitutes without departing from the scope of the invention. Components which may have functional equivalents include, inter alia, the transverse guides (240, 242, 250, 252, and 256), the flexures (226), the spring-loaded pivot (234), and the cam surface/roller combinations (260/224 and 262/236).

Additionally, the substrate/drum can include registration and tension pin pair assemblies on both edges, to engage pins on both sides of a perforated filmstrip.

Also, the present invention need not use a curved substrate, and is adaptable to linear substrate systems.

Given the above description of the essence of the present invention, it should also be noted that while the cam surfaces 260 and 262 have been included in the preferred embodiment as perhaps the simplest means of pin actuation, other means of pin actuation are also possible, including one or more of, among others, the following methods: electrical; mechanical; electromechanical; and hydraulics. For example, a piezoelectric actuator might take the place of the cam, for actuating the registration pin.

Although the preferred embodiment spaces registration and tension pins in such a manner that the aforementioned pins act upon adjacent perforations, it is possible to increase the relative spacing so that the pins operate on non-adjacent perforations (e.g., every third perforation). However, where the substrate is curved—as in the preferred embodiment—there is an increased likelihood that when using other than adjacent perforations, the force of the tension pin could cause the filmstrip to buckle.

PARTS LIST

100 Filmstrip transport and image registration system
102 Filmstrip
104 Rotary filmstrip transport substrate/drum mechanism
106 Vacuum holes
206 Filmstrip image/frame
208 Perforations
212 Registration and tension pin pair assembly
220 Registration pin
222 Registration pin body
224 Registration pin body roller
226 Registration pin flexures
228 Fixed body
230 Tension pin
232 Tension pin body
234 Tension pin body pivot point
235 Tension pin body spring
236 Tension pin body roller
240–242 Fixed filmstrip guide edges
250–252 Filmstrip guide rollers
256 Spring-loaded roller support
260–262 Cam surfaces

What is claimed is:

1. A filmstrip transport system adapted for perforated filmstrip transport and filmstrip image registration, said system comprising:
   a substrate adapted to apply a normal force to a filmstrip; and
   a plurality of registration-tension assemblies carried by said substrate, said registration-tension assemblies each comprising a registration pin member having a registration pin sized for a non-interference fit with filmstrip perforations and a tension pin member having a tension pin sized for a non-interference fit with filmstrip perforations;
   wherein said registration-tension assemblies have a registration mode to engage and register a filmstrip by resting an edge of one perforation of said filmstrip against the side of an inserted registration pin, and placing said filmstrip in tension by pulling said filmstrip via a tension pin inserted in another perforation in said filmstrip, in a direction substantially parallel to the direction of filmstrip transport and away from said registration pin; and
   wherein said registration-tension assemblies have a load mode to load the registration and tension pins into prospective perforations by moving said tension pin in a direction substantially parallel to the direction of filmstrip transport and toward said registration pin until said registration and tension pins achieve a distance therebetween permitting a non-interference fit into two filmstrip perforations.

2. The system in claim 1, wherein said substrate has a curvilinear shape when viewed from a vantage point with the edge of said filmstrip visible.

3. The system in claim 2, wherein said substrate is drumlike, and said substrate further comprises vacuum holes whereby a filmstrip is held in contact with said substrate via a vacuum created inside of said substrate, and acting through said vacuum holes.

4. The system in claim 1, wherein the relative motion of said registration and tension pins resembles the movement of scissors tips.

5. The system in claim 1, wherein said tension pin member is pivotally mounted to said substrate via a spring member, and the movement of said tension pin forms an arc.

6. The system in claim 1, wherein said registration pin member is mounted to said substrate via at least one flexible member.

7. The system in claim 5, wherein said substrate further comprises at least one cam surface adapted to guide the movement of said tension pin member to position said tension pin for said registration and load modes.

8. The system in claim 6, wherein said substrate further comprises at least one cam surface adapted to guide the movement of said registration pin member to position said registration pin for said registration and load modes.

9. The system in claim 1, wherein said tension pin member is pivotally mounted to said substrate via a spring member, and the movement of said tension pin forms an arc, said registration pin member is mounted to said substrate via at least one flexible member, wherein said substrate further comprises at least one cam surface adapted to guide the movement of said tension pin member to position said tension pin for said registration and load modes, and another cam surface adapted to guide the movement of said registration pin member to position said registration pin for said registration and load modes.

10. The system in claim 1 wherein said registration and tension pins are relatively spaced to fit into adjacent filmstrip perforations.

11. A method of transporting and registering a filmstrip, said method comprising the steps of:
   via a substrate, providing a normal force to a filmstrip;
   providing a plurality of registration-tension assemblies carried by said substrate, said registration-tension assemblies each comprising a registration pin member having a registration pin sized for a non-interference fit with filmstrip perforations and a tension pin member having a tension pin sized for a noninterference fit with filmstrip perforations;
   providing a registration mode to engage and register a filmstrip by resting an edge of one perforation of said filmstrip against the side of an inserted registration pin, and placing said filmstrip in tension by pulling said filmstrip via a tension pin inserted in another perforation in said filmstrip, in a direction substantially parallel to the direction of filmstrip transport and away from said registration pin; and
   providing a load mode to load the registration and tension pins into prospective perforations by moving said tension pin in a direction substantially parallel to the direction of filmstrip transport and toward said registration pin until said registration and tension pins achieve a distance therebetween permitting a non-interference fit into two filmstrip perforations.

12. The method in claim 11, wherein said substrate has a curvilinear shape when viewed from a vantage point with the edge of said filmstrip visible.

13. The method in claim 12, wherein said substrate is drumlike, and said substrate further comprises vacuum holes, said method further comprising the step of holding a filmstrip in contact with said substrate via a vacuum created inside of said substrate, and acting through said vacuum holes.

14. The method in claim 11, wherein the relative motion of said registration and tension pins resembles the movement of scissors tips.

15. The method in claim 11, wherein said tension pin member is pivotally mounted to said substrate via a spring member, and the movement of said tension pin forms an arc.

16. The method in claim 15, wherein said substrate further comprises at least one cam surface, said method further comprising the step of guiding the movement of said tension pin member to position said tension pin for said registration and load modes.

17. The method in claim 11, wherein said registration pin member is mounted to said substrate via at least one flexible member.

18. The method in claim 17, wherein said substrate further comprises at least one cam surface, said method further comprising the step of guiding the movement of said registration pin member to position said registration pin for said registration and load modes.

19. The method in claim 1, wherein said tension pin member is pivotally mounted to said substrate via a spring member, and the movement of said tension pin forms an arc, said registration pin member is mounted to said substrate via at least one flexible member, wherein said substrate further comprises a first cam surface and a second cam surface, said method further comprising the steps of:

via said first cam surface, guiding the movement of said tension pin member to position said tension pin for said registration and load modes; and via said second cam surface, guiding the movement of said registration pin member to position said registration pin for said registration and load modes.

20. The method in claim 1, further comprising the step of providing a relative spacing between said registration and tension pins so that said registration and tension pins fit into adjacent filmstrip perforations.

* * * * *